Oct. 10, 1967 R. N. DOBLE ETAL 3,346,856
INDUCTIVE LOOP VEHICLE DETECTOR
Filed July 6, 1964 2 Sheets-Sheet 1

INVENTORS:
ROBERT N. DOBLE
ROBERT J. MILLER
LAWRENCE SEPE

BY Edward A. Robinson
ATTORNEY

United States Patent Office 3,346,856
Patented Oct. 10, 1967

3,346,856
INDUCTIVE LOOP VEHICLE DETECTOR
Robert N. Doble, Palo Alto, Robert J. Miller, San Bruno, and Lawrence Sepe, San Francisco, Calif., assignors to General Precision Systems Inc., a corporation of Delaware
Filed July 6, 1964, Ser. No. 380,559
6 Claims. (Cl. 340—258)

This invention relates to circuits for sensing the presence of vehicles in highway traffic lanes, along railroad tracks, or the like; and more particularly, this invention relates to a circuit employing an oscillator having an inductive loop positioned adjacent to or beneath a traffic lane whereby a vehicle entering into the proximity of the loop will vary the inductive value thereof to vary the frequency of the loop oscillator.

U.S. Letters Patent No. 3,164,802, issued on a co-pending patent application filed by Robert A. Kleist and John Scarbrough on Mar. 13, 1961, entitled, "Inductive Loop Presence Detector," Ser. No. 95,236, discloses a vehicle detection system wherein an oscillator employing inductive loop shifts in frequency when a vehicle enters the magnetic field of the loop. Another system is disclosed by a further co-pending patent application, Ser. No. 172,620 entitled, "Inductive Loop Vehicle Presence Detector," filed Feb. 12, 1962, by Martin John Prucha. In these systems, a signal from the loop oscillator is passed to a mixing circuit together with a reference signal to generate a difference frequency signal. When a vehicle enters the magnetic field of the inductive loop, the loop oscillator shifts in frequency, and the difference frequency generated by the mixer circuit is shifted considerably. Further circuitry is operated by the shift in the difference frequency to cause relay switching for operating counters, traffic signals, gates and the like.

Presence detector systems have been made and successfully operated using the combination of a loop oscillator and a standard reference oscillator as indicated above. Problems have arisen due to the fact that the loop oscillator has an inherent drift characteristic since the frequency of the output signal is determined by the inductive value of the loop. The loop is normally embedded in the paving of a street, and is subject to changing environmental conditions due to changes in weather. The moisture content of the ground may vary considerably from periods of dry weather to other periods of rain or snow, and the temperature of the oscillator and its loop is subject to considerable variation. The drift of the loop oscillator due to changing environmental conditions has become a serious problem, and is a principal cause of malfunctioning of such vehicle detector systems.

A further vehicle presence detector system has been disclosed by Patent No. 2,917,732 granted to W. P. Chase et al. on Dec. 15, 1959. This system utilizes a loop oscillator with a long time constant servo arrangement to correct for the oscillator drift. Thus, gradual changes in environmental conditions due to changes in weather will be compensated for. On the other hand, abrupt changes in the oscillator frequency due to the presence of a vehicle will cause switching action. Although a long time constant servo arrangement will correct gradual oscillator drift, it has been considered undesirable to use mechanical elements or moving parts in such a system.

It is an object of this invention to provide an improved presence detector system having an inductive loop, the frequency of which will cause switching action for the detection of a vehicle, and further having an automatic frequency control arrangement to compensate for gradual drift of the loop oscillator.

It is a further object of this invention to provide an improved vehicle presence detector system wherein the output signal of a loop oscillator is mixed with the signal from a voltage controlled variable frequency oscillator to obtain a difference frequency signal; and having an AFC arrangement for controlling the frequency of the variable frequency oscillator, and thereby maintaining the difference frequency signal constant—the AFC circuit having a dual time constant arrangement whereby any decrease in the difference frequency will cause a fast compensation through control of the variable frequency oscillator, but an abrupt increase in the difference frequency (indicating the presence of a vehicle) will be compensated only through a long time constant.

Another object of this invention is to provide a vehicle detector with an arrangement for effectively amplifying direct current signals which is more economical to build than present direct coupled amplifiers, and more particularly, it is an object to provide a diode switching arrangement for passing an alternating current in accordance with a direct potential input signal, the alternating current being amplified and subsequently rectified to generate a direct current output signal corresponding to the direct current input signal.

Yet another object of this invention is to provide a vehicle detector system wherein the drift of a loop oscillator is compensated for by a dual time constant circuit wherein a long time constant is obtained to hold a relay, said dual time constant circuit being further arranged such that the holding network will accumulate charge at a lesser rate than a further capacitor of an automatic frequency control network whereby a fast system recovery is assured following a faulty operation or power failure.

Numerous other objects and advantages will be apparent throughout the progress of the specification which follows. The accompanying drawings illustrate a certain exemplary embodiment of the invention and the views therein are as follows.

Figure 1:
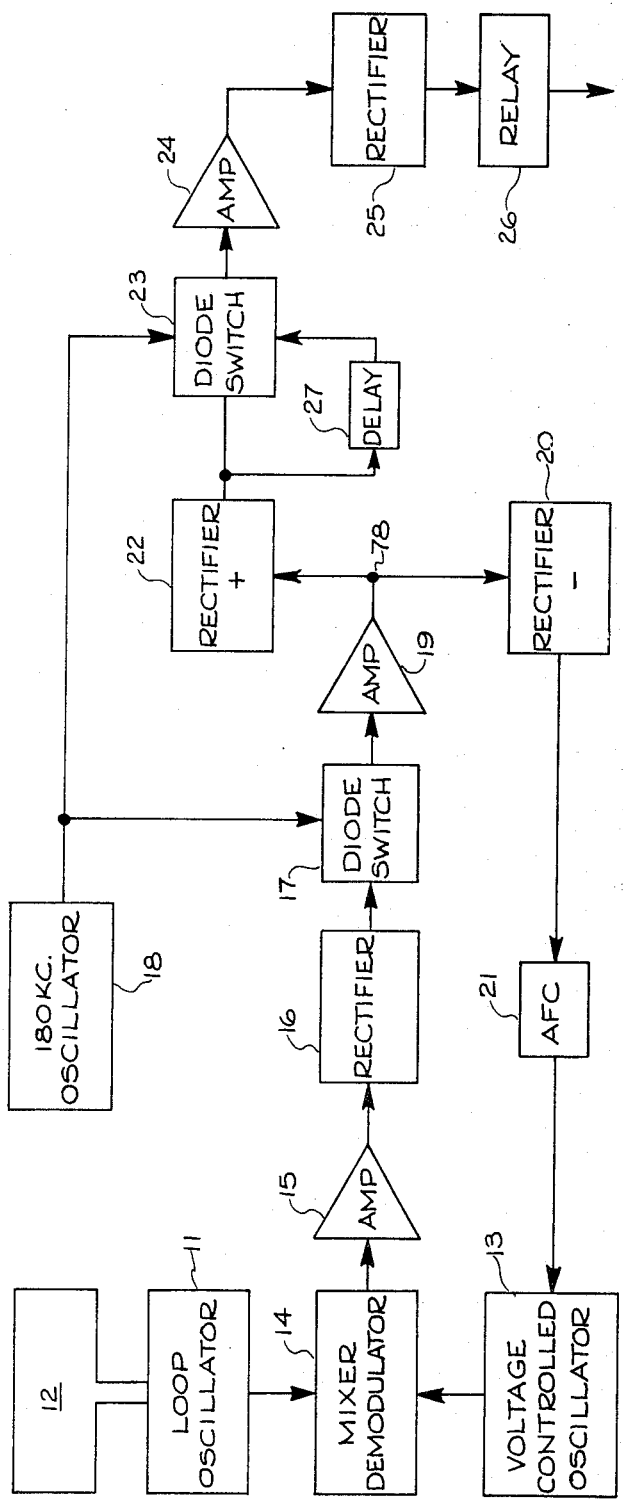
FIGURE 1 is a system diagram of the vehicle detector of this invention wherein the various component circuits are shown as blocks.

Briefly stated, and with reference to FIGURE 1, a preferred form of the presence detector system of this invention includes a first oscillator 11 having a loop 12 electrically connected as a frequency determining element of this circuit, and a voltage controlled oscillator 13, both oscillators being coupled to a mixer de-modulator circuit 14. A signal generated by the mixer circuit 14 has a frequency equal to the difference between the frequencies of the oscillators 11 and 13. The difference frequency signal is amplified by a circuit 15. The amplifier 15 has non-linear characteristics with respect to the frequency of the signal applied thereto such that low frequency signals are passed with greater amplitude than higher frequency signals. A rectifier circuit 16 generates a direct potential level corresponding to the amplitude of the signal passed from the amplifier 15. A diode switch or gate 17 receives a signal from a third oscillator 18 and is operable to pass this signal in accordance with the signal level from the rectifier 16. Another amplifier 19 receives the 180 kilocycle signal from the diode switch 17 and generates an output signal having an amplitude corresponding with the direct current level from the rectifier 16. Another rectifier 20 generates a negative potential corresponding to the amplitude of the 180 kilocycle signal, and this signal is passed via an automatic frequency control, AFC, network 21 to control the variable frequency oscillator 13. The diode switch 17, alternating current amplifier 19 and rectifier 20 accomplish an amplification of the direct current signal from the rectifier 16. Another rectifier 22 receives the 180 kilocycle signal from the amplifier 19 and generates a positive potential therefrom. A second diode switch 23 passes the 180 kilocycle signal to a further alternating current amplifier 24 and thence to a further rectifier 25. Again, the combination of diode switch amplifier and rectifier accomplishes an amplification of the direct potential from the rectifier 22. The rectified output signal from the circuit 25 may be coupled to a load device such as a relay for providing switching required for the operation of traffic lights, parking gates, etc.

Figure 2:
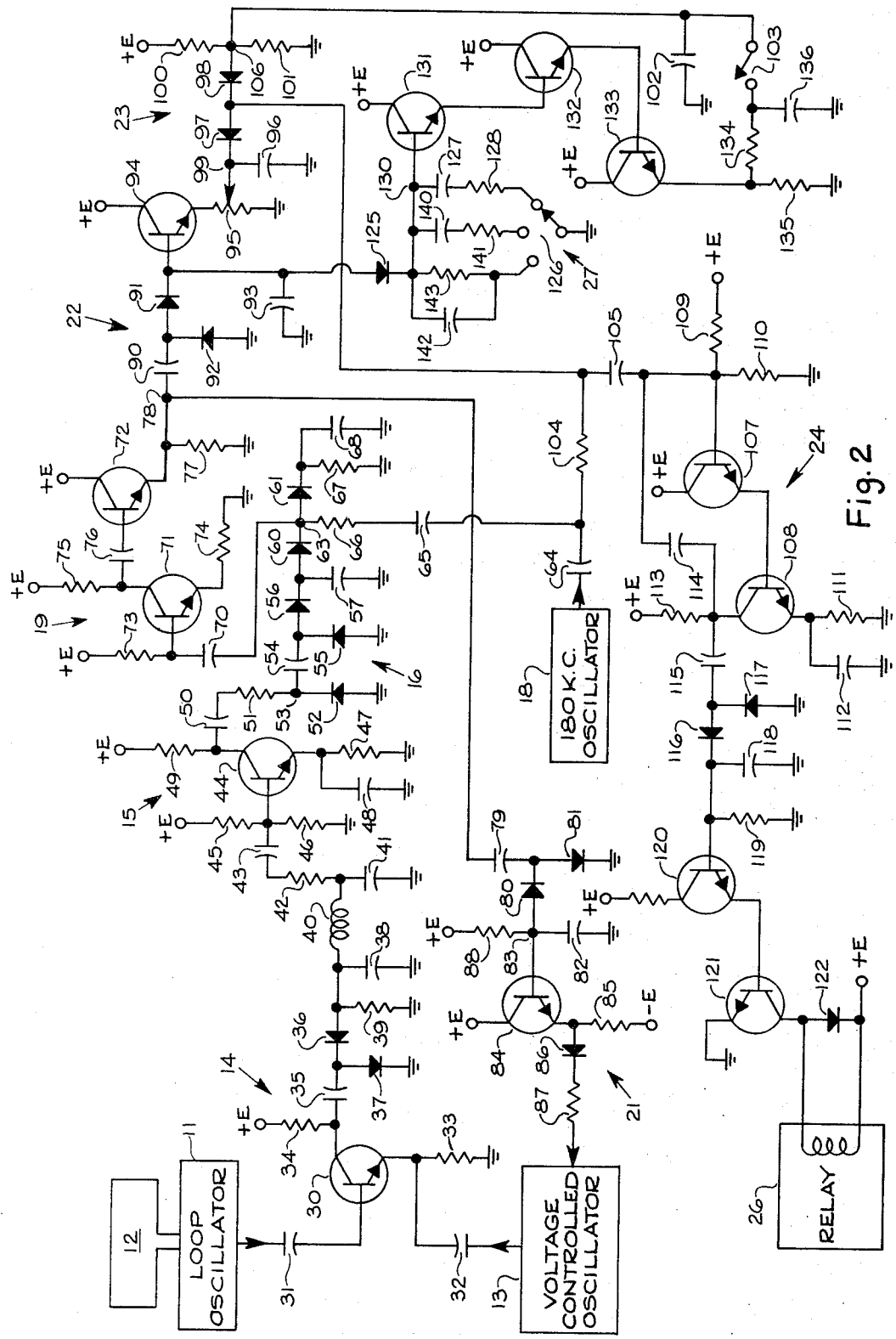
FIGURE 2 is a more detailed diagram of the presence detector system wherein only certain standard components are indicated as blocks.

Referring to the more complete circuit diagram of FIGURE 2, it will be appreciated that a first transistor 30 is coupled via a capacitor 31 to receive the signal from the loop oscillator 11, and via another capacitor 32 to receive the signal from the voltage controlled oscillator 13. The signal from one of the oscillators is applied to the base electrode of the transistor 30 while the signal from the other oscillator is applied to the emitter electrode. A resistor 33 couples the emitter electrode to the ground reference potential. A load resistor 34 couples the collector electrode of the transistor 30 to a positive reference potential. The signal appearing at the collector electrode of the transistor 30 will include both of the radio frequency signals from the oscillators and will also include sum and difference frequencies. These signals are passed to a diode de-modulating circuit by a capacitor 35. Two diodes 36 and 37 are coupled as a voltage doubler or de-modulating circuit, and a capacitor 38 receives the low frequency difference signal together with a direct potential. A resistor 39 provides a discharge path for the capacitor 38. The capacitor 38 together with an inductive element 40 and a second capacitor 41 constitute a low pass filter for further attenuating high frequency signals. Thus, the filter network 38, 40 and 41 eliminates the higher radio frequency signals of the oscillators 11 and 13 but passes the difference frequency signal which is normally of the order of 1,000 cycles. This filter further accomplishes an attenuation when the difference frequency signals increase in value substantially greater than 1,000 cycles. In a co-pending patent application, Ser. No. D. 526, filed concurrently herewith by Robert N. Doble and Robert J. Miller entitled "Voltage Controlled Oscillator" the structure and operation of the oscillator 13 is disclosed and claimed. The structure of the loop oscillator is disclosed in the co-pending patent application, Ser. No. 172,620, supra. Ordinarily, the loop oscillator will operate at a frequency in the order of 95 to 100 kilocycles. The voltage controlled oscillator 13 will assume a frequency of approximately 1,000 cycles less than that of the loop oscillator to provide the difference frequency of 1,000 cycles.

An RC network including a resistor 42 and a capacitor 43 passes the difference frequency signals to a second transistor 44 which functions as an alternating voltage amplifier. A voltage dividing network including a resistor 45 and another resistor 46 provides a bias for the collector electrode of the transistor 44. The emitter electrode of the transistor 44 is coupled to ground by a resistor 47 which is by-passed by a capacitor 48. A load resistor 49 is coupled between the positive reference potential +E and the collector electrode of the transistor 44. Another RC network includes a capacitor 50 and a resistor 51 for passing the amplified alternating potential from the transistor 44 which constitutes the amplifier 15. A Zener diode 52 clips the amplified signal whereby the difference frequency appears as a square wave at a point 53. A capacitor 54 discriminates against the higher frequency difference signals, but passes the lower frequency difference signals to the voltage doubler rectifier circuit 16. This rectifier circuit comprises a first diode 55 coupled to ground and a second diode 56 coupled to pass a rectified signal to a capacitor 57. The rectified direct voltage signal appearing at a point 58 is inversely proportional to the difference frequency from the mixer circuit 14. Therefore, during normal operation, the loop oscillator 11 oscillates at a frequency 1,000 cycles greater than the frequency of the voltage controlled oscillator 13 such that the difference frequency from the circuit 14 passed by the amplifier 15 will cause a D.C. level to appear at the point 58.

A pair of diodes 60 and 61 constitute the diode switch 17 for passing a signal from the other oscillator 18. The oscillator 18 functions to generate a signal which may nominally be of the order of 180 kilocycles. This signal frequency need not be maintained with any high degree of accuracy, and therefore, any known inexpensive oscillator such as a Hartley oscillator may be used. The 180 kc. signal is passed to the series connection point 63 between the diodes 60 and 61 via capacitors 64 and 65 and a resistor 66. When the potential of the point 58 is relatively negative with respect to ground, the diodes 60 and 61 are cut off and remain in a state of non-conduction. In this condition, the signal from the oscillator 62 will be passed through the point 66 without substantial attenuation and via a capacitor 70 to the base electrode of a transistor 71. On the other hand, if the potential of the point 58 is relatively positive with respect to ground, the diodes 60 and 61 become conductive and a relatively low impedance path is provided to ground potential from the point 63. In this case, the signal from the oscillator 62 is attenuated through the resistor 66 and is by-passed to ground at the point 63, such that this signal does not reach the base electrode of the transistor 71. The transistor 71 together with an emitter follower transistor 72 constitutes the amplifier 19. The base electrode of the transistor 71 is coupled to the positive reference potential +E via a resistor 73. The emitter electrode is coupled to ground by a resistor 74 and the collector electrode is coupled to the positive reference potential by the load resistor 75. The 180 kilocycle signal is passed from the collector electrode of the transistor 71 to the base electrode of the transistor 72 by a capacitor 76. The collector electrode of the emitter follower 72 is directly connected to the positive reference potential +E and the emitter electrode is coupled to ground by a load resistor 77. The signal appearing at a point 78, the emitter electrode of the transistor 72 is the 180 kc. signal of the oscillator 18 which has been selectively attenuated by the diode switch 17 and amplified by the amplifier 19. Thus, the amplitude of the 180 kc. signal appearing at the point 78 corresponds to the difference frequency generated by the mixer circuit 14.

The signal from the point 78 is passed via a capacitor 79 and is rectified by a voltage doubler circuit including diodes 80 and 81. The polarity of the diodes 80 and 81 is such to charge a capacitor 82 such that a negative AFC signal will appear at a point 83 coupled to the base electrode of an AFC transistor 84. The transistor 84 is the emitter follower having the collector electrode thereof directly coupled to the positive reference potential +E, and the emitter electrode thereof coupled to below ground reference potential by a resistor 85. A relatively high impedance circuit including a diode 86 and a resistor 87 pass the AFC voltage to the voltage controlled oscillator 13. As indicated above, the oscillator 13 is disclosed and claimed in the co-pending patent application, Ser. No. D. 526 supra, and functions to provide an output signal having a frequency determined by the AFC voltage impressed thereon. The capacitor 82 functions to store the AFC voltage generated by the diodes 80 and 81 which constitute the rectifier 20. This capacitor together with a resistor 88 provides a time delay in the AFC loop.

The signal appearing at the point 78 is passed by a capacitor 90 to a voltage doubler rectifier circuit including diodes 91 and 92. A capacitor 93 receives and stores the direct voltage generated by the rectifier 22. The rectified voltage is impressed upon the base electrode of a transistor 94 which is coupled as an emitter follower with the collector electrode directly connected to the positive reference potential and the emitter electrode coupled to ground through a potentiometer 95. The potentiometer 95 constitutes a sensitivity or gain control and a voltage obtained therefrom is stored in a capacitor 96.

The second diode switch 23 includes a pair of diodes 97 and 98 coupled between the direct voltage of the point 99 from the rectifier 22 and a bias potential which may be established by a potential dividing resistor network including resistors 100 and 101, or alternatively, may be established as the charge on a capacitor 102 which is passed by a normally closed switch 103. The signal from the oscillator 18 will be passed via the capacitor 64, a resistor 104 and a capacitor 105 providing the diodes 97 and 98 remain in a state of non-conduction. When the voltage at the point 99 as compared to the voltage at the point 106 causes the diodes to conduct, the signal from the oscillator 62 will be attenuated in the resistor 104 and by-passed to ground by the diodes 97 and 98.

Transistors 107 and 108 constitute the amplifier 24. The collector electrode of the transistor 107 is directly connected to the positive reference potential while the base electrode receives the 180 kc. signal via the capacitor 105. The base electrode is biased by a potential dividing network including resistors 109 and 110. The base electrode of the transistor 108 is directly connected to the emitter electrode of the transistor 107 to provide a Darlington amplifier circuit. The emitter electrode of the transistor 108 is coupled to ground by a resistor 111 which is by-passed by a capacitor 112. The collector electrode is coupled to the positive reference potential by a resistor 113. A feedback path is provided by the capacitor 114 coupled between the collector electrode of the transistor 108 and the base electrode of the transistor 107. The amplified attenuating signal is passed via a coupling capacitor 115 to the rectifier 25 which includes diodes 116 and 117. The rectified D.C. level is stored in a capacitor 118. A resistor 119 provides a leakage path for discharging the capacitor 118. Two further transistors 120 and 121 provide a power amplification of the direct current signal for operation of the relay 26. A diode 122 is coupled across the coil of the relay to provide a path for current flow from the inductive element when the transistor 121 cuts off and becomes non-conductive thereby eliminating a possible surge current which may damage the transistor. The relay 26 may be of any conventional type to provide switching for the operation of devices such as traffic lights, gates, vehicle counters or the like.

A diode 125 couples the delay circuit 27 to receive the direct current level from the rectifier 22 which is stored by the capacitor 93. A multi-position switch 126 provides a coupling to ground of a selected one of several RC circuits each coupled to the diode 125. As shown in the drawing, the switch provides a ground connection to one of the RC circuits including a capacitor 127 and a resistor 128. The capacitor 127 will therefore accumulate charge from the rectifier 22 via the diode 125.

If a vehicle moves into the field of the loop 12, the frequency of the loop oscillator would increase somewhat, and the difference frequency of the mixer circuit 14 would increase considerably. In this event, the voltage level of the rectifier 22 would decrease, and the diode 125 will cut off. The capacitor 127 will retain its charges for a period of time (exceeding 20 minutes) depending on the value of the capacitor and the resistance of its discharge path. A series of transistors 131, 132 and 133 are connected as a Darlington amplifier to transfer the voltage stored by the capacitor 127 via a resistor 134, and the switch 103 to establish the voltage of the point 106. The total impedance looking into the Darlington amplifier at the base of the transistor 131 is substantially equal to the product of the amplification or beta factors of each of the individual transistors 131, 132 and 133, times the value of a resistor 135 coupled to the emitter of transistors 133. In a preferred embodiment of this invention, the resistor 135 was of a value of 150,000 ohms, and each transistor 131, 132 and 133 has a beta factor of 100 such that the leakage path for discharging the capacitor 127 is a very high value.

As indicated above, the potential of the point 106 is established by the voltage appearing on a capacitor 102 and with the switch 103 closed, by a similar voltage stored by a capacitor 136. This voltage is determined by the stored voltage of the capacitor 127 which is passed to the capacitor 102 and 136 via the three transistors of the Darlington amplifier. In this case, the potential dividing network of the resistors 100 and 101 will have negligible effect upon the voltage of the point 106. On the other hand, if the switch 103 were opened (for tuning and calibration purposes) the voltage from the Darlington amplifier 131–133 will be isolated from the point 106 and under these conditions the potential dividing network 100 and 101 will establish the voltage thereof. In the preferred embodiment, the resistor 100 was valued at 4.7 megohms, and resistor 101 was valued at 3.9 megohms.

As indicated above, the time constant for discharge of the capacitor 127 is determined by the impedance path of the Darlington amplifier 130–131. The resistor 128 may have a more nominal value such as 47,000 ohms and is effective for determining the time constant of the charging rate for the capacitor 127 when the diode 125 is conductive. In the preferred embodiment of this invention the capacitor 127 was valued at 5 microfarads and the discharge time constant was determined experimentally to exceed 20 minutes. If the switch 126 is tuned to the central position, a capacitor 140 and a resistor 141 are coupled between the point 130 and ground. The capacitor 140 may have a value of the order of .33 microfarad, and therefore, the time constant is substantially less than that of the first branch including the capacitor 127. When the diode 125 is cut off, the capacitor 140 discharges through substantially the same path as the capacitor 127—the path including the three transistors of the Darlington amplifier. The resistor 141 being of a lesser value will be effective to determine the charge rate of the capacitor 141 but will have negligible effect on the discharge rate. If a pulse mode of operation is desired, the switch 126 is positioned such that the capacitor 142 and the resistor 143 are coupled between the point 130 and ground. In this case, the discharge path for the capacitor 142 is provided by the resistor 143, and the time required for discharge may be a fraction of a second. The presence detector may be switched into a pulse mode of operation when it is desired merely to count vehicles proceeding along a traffic lane, and in this mode the relay 26 will be operated for a brief interval during the passage of each vehicle.

When a vehicle enters the field of the loop 12, the loop oscillator increases in frequency, and when the vehicle leaves the loop, the oscillator decreases in frequency returning to normal. If we assume that a vehicle was stalled or was parked over the loop when the system was initially turned on, or if the vehicle remained over the loop for a time sufficiently long that the charge will have leaked from the capacitor 127 (or 140), it would be possible for the AFC to bring the system into balance with no presence indication, even with the vehicle over the loop. Thence, when the vehicle leaves the field of the loop, the loop oscillator would decrease in frequency tending to bring the difference frequency to a value less than the normal 1,000 cycles. Under these conditions, the diode 125 will be conductive and the capacitor 127 would charge at a rate determined by the resistor 128. The AFC circuit will follow the decrease in loop oscillator frequency with no substantial delay, and the system will become operative in a normal state immediately as the vehicle leaves the loop.

It has been found that the AFC circuit is most effective if the voltage controlled oscillator 13 does not entirely compensate for drift of the loop oscillator. Therefore, when a vehicle enters the field of the loop, the voltage controlled oscillator will make a correction in a relatively short time constant, but this correction will not bring the difference frequency completely to the normal level of a nominal 1,000 cycles. In the meantime, the delay circuit 27 will be effective to hold the relay 26 in a state to produce a desired switching and vehicle indication.

The resistor 128 (and corresponding resistor 141) provide a slight time delay in the charging of the capacitor 127 (or 140). This insures a fast recovery to normal operation once the vehicle detection system has been rendered inoperative due to a fault such as a power failure. Upon returning to operation, the capacitor 57 which maintains a charge in response to the AFC circuit will receive charge before the capacitor 127 (or 140) receives a corresponding normal charge. Therefore, the dual time constant delay circuit 27 assures that the AFC circuit must first become effective before there can be any relay switching operation.

In more recent vehicle detector systems, the switch 126 has been modified somewhat such that the capacitors 127 and 140 will be shorted and discharged except when selected for use. This innovation has remedied possible faulty operation due to changing positions of the switch 126, whereas it otherwise would be possible to place a heavy charge on a capacitor inadvertently during a first test, then to change the switch 126 while conditions are changed, and then to return to the first position with an abnormally heavy charge on the capacitor 127.

As indicated above, the switch 103 is provided for calibration and tuning purposes. This switch may be opened to initially tune the system upon installation. With the switch 103 open, the voltage appearing at the point 106 is determined by the potential dividing network including the large value resistors 100 and 101. Thus, a standard voltage is placed on the point 106 and the voltage controlled oscillator may be manually tuned until the voltage of the point 99 is balanced against the standard voltage of 106. After the tuning operation has been completed, the switch 103 is closed and the high impedance resistive network 100–101 becomes ineffective to control the voltage at the point 106.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. A vehicle detection system comprising a first oscillator including an inductive loop, a second oscillator, a mixer circuit coupled to both oscillators for generating a difference frequency signal, a discriminator coupled to the mixer circuit for generating a direct signal level corresponding to the difference frequency, means for amplifying the direct signal level, an automatic frequency control circuit coupled to control the frequency of the second oscillator from the direct signal level, a means for storing a signal level corresponding to the direct signal level, said signal storing means having dual time constant paths whereby a signal level may be received relatively fast and may be dissipated relatively slowly, and a switching means coupled to the direct signal level and to the signal level storing means, said switching means being responsive to the relative values of the direct signal level and the stored signal level.

2. The vehicle detection system in accordance with claim 1 wherein the means for amplifying the direct current level comprises a source of alternating current signal, a diode switching means coupled to receive the alternating current signal, said diode switching means being responsively coupled to the direct signal level whereby the alternating current signal is passed in accordance with the direct signal level, an amplifier capable of passing and amplifying the alternating current signal, and a rectifier coupled to the amplifier for rectifying the amplified alternating current signal and for generating a direct output signal level.

3. A vehicle detection system comprising a first oscillator including an inductive loop, a second oscillator, a mixer circuit coupled to both oscillators for generating a difference frequency signal, a discriminator coupled to the mixer circuit for generating a first direct signal level corresponding to the difference frequency, a third oscillator for generating an alternating current signal, a switching means coupled to the third oscillator for passing the alternating current signal, said switching means being responsively coupled to the first direct current level whereby the alternating current signal is passed in accordance with the value of the first direct current level, said switching means including a pair of diodes coupled together at a junction point, the first of the diodes being coupled between the first direct current level and the junction point, the second diode being coupled between a reference potential and the junction point, the alternating current signal being coupled to the junction point whereby the alternating signal is passed when the direct current signal is of a value to bias the diodes into non-conduction, and the alternating current signal is attenuated when the direct current level is of a value to bias the diodes into conduction, an amplifier coupled to the switching means for amplifying and passing the alternating current signal, a rectifier coupled to the amplifier for generating a second direct current level corresponding to the first direct current level and an automatic frequency control means controllably coupled to the second oscillator and responsively coupled to the rectifier means whereby the frequency of the second oscillator and the difference signal is controlled by the direct current levels.

4. A vehicle detection system comprising a first oscillator including an inductive loop, a second oscillator, a mixer circuit coupled to both oscillators for generating a difference frequency signal, a discriminator coupled to the mixer circuit for generating a direct signal level corresponding to the difference frequency, means for amplifying the direct signal level, an automatic frequency control circuit coupled to control the frequency of the second oscillator from the direct signal level, a means for storing a signal level corresponding to the direct signal level, said signal storing means comprising a capacitor coupled to receive the direct signal level, a first impedance element coupled between the capacitor and a reference voltage for providing a first time constant for accumulation of charge on the capacitor, a direct coupled amplifier coupled between the capacitor and the reference potential for providing a discharge path of a second time constant, and a switching means coupled to the direct signal level and to the direct coupled amplifier, said switching means being responsive to the relative values of the direct switching level and the stored level of the capacitor.

5. A vehicle detection system comprising a first oscillator including an inductive loop, a second oscillator, a mixer circuit coupled to both oscillators for generating a difference frequency signal, a discriminator coupled to the mixer circuit for generating a direct signal level corresponding to the difference frequency, means for amplifying the direct signal level, an automatic frequency control circuit coupled to control the frequency of the second oscillator from the direct signal level, a means for storing a signal level corresponding to the direct signal level, said signal storing means comprising a multi-position switch coupled to ground reference potential, a diode coupled to the direct signal level, a plurality of capacitors coupled between the diode and respective positions of the multi-position switch, a resistor associated with each capacitor for establishing a first time constant for charging the capacitors and a direct coupled amplifier coupled between the ground reference potential and the plurality of diodes for providing a discharge path having a second time constant, a diode switching means coupled to the direct signal level and to the direct coupled amplifier, said switching means being responsive to the relative values of the direct switching level and the stored signal level of a selected capacitor.

6. The vehicle detection system in accordance with claim 5 wherein the signal level storing means include a further capacitor and a further resistor coupled in parallel and coupled between the diode and one of the positions of the multi-position switch, said resistor providing a discharge path for the capacitor whereby a short duration pulse signal may be generated by the vehicle detection system.

No references cited.

NEIL C. READ, *Primary Examiner.*

THOMAS B. HABECKER, *Examiner.*